United States Patent
Bevemyr et al.

(10) Patent No.: US 10,462,010 B2
(45) Date of Patent: Oct. 29, 2019

(54) DETECTING AND MANAGING RECURRING PATTERNS IN DEVICE AND SERVICE CONFIGURATION DATA

(71) Applicant: Cisco Technology, Inc., San Jose, CA (US)

(72) Inventors: Johan Bevemyr, Sollentuna (SE); Carl Moberg, Bromma (SE)

(73) Assignee: CISCO TECHNOLOGY, INC., San Jose, CA (US)

(*) Notice: Subject to any disclaimer, the term of this patent is extended or adjusted under 35 U.S.C. 154(b) by 142 days.

(21) Appl. No.: 15/621,255

(22) Filed: Jun. 13, 2017

(65) Prior Publication Data
US 2018/0359146 A1 Dec. 13, 2018

(51) Int. Cl.
*G06F 15/177* (2006.01)
*H04L 12/24* (2006.01)
(Continued)

(52) U.S. Cl.
CPC ........ *H04L 41/085* (2013.01); *G06F 9/44505* (2013.01); *G06F 16/2246* (2019.01); *H04L 41/08* (2013.01); *H04L 41/0843* (2013.01); *H04L 41/0856* (2013.01); *H04W 24/04* (2013.01); *H04W 24/08* (2013.01)

(58) Field of Classification Search
CPC ... H04L 41/085; H04L 41/08; H04L 41/0843; H04L 41/0856; G06F 16/2246; G06F 9/44505; H04W 24/04; H04W 24/08
See application file for complete search history.

(56) References Cited

U.S. PATENT DOCUMENTS

| | | | |
|---|---|---|---|
| 2005/0022115 A1* | 1/2005 | Baumgartner | G06F 16/9535 715/205 |
| 2009/0185509 A1* | 7/2009 | Lundstrom | H04L 41/0856 370/256 |

(Continued)

OTHER PUBLICATIONS

International Search Report and Written Opinion from the International Searching Authority, dated Sep. 24, 2018, 11 pages, for corresponding International Patent Application No. PCT/US2018/037208.

(Continued)

*Primary Examiner* — Jonathan A Bui
(74) *Attorney, Agent, or Firm* — Polsinelli PC

(57) ABSTRACT

The present disclosure provides systems, methods, and computer-readable media for orchestrating and managing configuration data of network devices and services. In one aspect, a device includes one or more processors and memory. The memory is configured to store computer-readable instructions, which when executed by the one or more processors, cause the one or more processors to obtain configuration parameters of services and devices of a network infrastructure, the configuration parameters having a tree representation, create a copy of the tree representation of the configuration parameters and generate a template having a plurality of matched pattern instances based on the copy of the tree presentation of the configuration parameters, each of the plurality of matched pattern instances being a single representation of configuration parameters for at least two different services or devices of the network infrastructure.

18 Claims, 5 Drawing Sheets

(51) Int. Cl.
    *G06F 16/22*    (2019.01)
    *G06F 9/445*    (2018.01)
    *H04W 24/04*    (2009.01)
    *H04W 24/08*    (2009.01)

(56) References Cited

U.S. PATENT DOCUMENTS

| | | |
|---|---|---|
| 2009/0216867 A1 | 8/2009 | Pusateri et al. |
| 2011/0016153 A1* | 1/2011 | Atta ................... G06F 16/282 |
| | | 707/797 |
| 2017/0300248 A1* | 10/2017 | Purohit ................ G06F 3/0619 |
| 2017/0337191 A1* | 11/2017 | Narayanan ............ G06F 17/271 |
| 2017/0346692 A1* | 11/2017 | Haapanen ........... H04L 41/0843 |
| 2018/0013625 A1* | 1/2018 | Gao ....................... H04L 41/00 |
| 2018/0109421 A1* | 4/2018 | Laribi ................. H04L 41/0843 |

OTHER PUBLICATIONS

Author Unknown, "Yang," Wikipedia, Mar. 31, 2017, available at https://en.wikipedia.org/w/index.php?title=YANG&oldid=773136822, retrieved on Apr. 24, 2019, 6 pages.

* cited by examiner

DETECTING AND MANAGING RECURRING PATTERNS IN DEVICE AND SERVICE CONFIGURATION DATA

TECHNICAL FIELD

The present technology pertains to orchestrating and streamlining extraction and management of configuration data of network services and devices.

BACKGROUND

In order to meet the ever growing demand for services by their customers, service providers and vendors deploy an infrastructure that is comprised of large sets of devices and services (both physical and virtual). As a service provider's infrastructure grows, so does the tedious task of managing (e.g., versioning, modification, verification, etc.) configuration data of each and every one of the devices and services that form this expanding infrastructure. This configuration is often related to customer-facing services (e.g., L3 virtual private networks (VPNs) or firewall rules, or operational readiness (e.g., SNMP configuration, administrate access rules, etc.)). The lack of formal lifecycle management of this data (e.g., versioning, verification, etc.) leads to deficiencies such as dead or inactive configuration, sub-optimal configuration across different operating systems, policy violations in security-related contexts, etc. Furthermore, a significant portion of this data configuration is currently performed manually.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Figure 1:
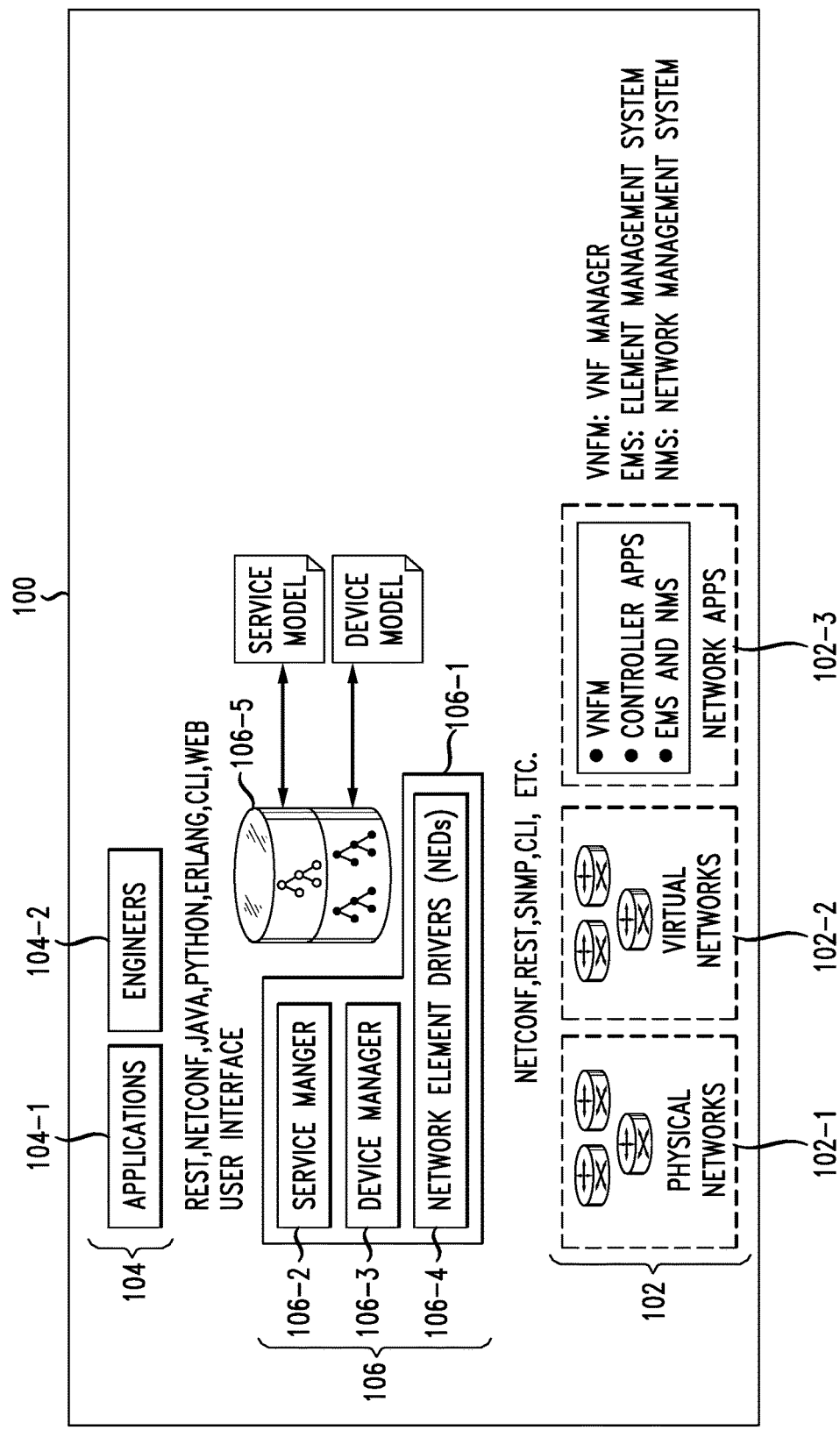
FIG. 1 illustrates network architecture, according to one aspect of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

References to one or an embodiment in the present disclosure can be, but not necessarily are, references to the same embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various features are described which may be features for some embodiments but not other embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program services or functional processes include routines, programs, objects, components, data structures, etc., that perform particular tasks or implement particular abstract data types and may be implemented using hardware at network elements. Non-limiting examples of such hardware may include one or more Central Processing Units (CPUs), digital signal processors (DSPs), application-specific-integrated-circuits, field programmable gate arrays (FPGAs), computers or the like.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

1. Overview

In one aspect, a method includes obtaining configuration parameters of services and devices of a network infrastructure, the configuration parameters having a tree representation, creating a copy of the tree representation of the configuration parameters, and generating a template having a plurality of matched pattern instances based on the copy of the tree presentation of the configuration parameters, each of the plurality of matched pattern instances being a single representation of configuration parameters for at least two different services or devices of the network infrastructure.

In one aspect, a device includes one or more processors and memory. The memory is configured to store computer-readable instructions, which when executed by the one or more processors, cause the one or more processors to obtain configuration parameters of services and devices of a network infrastructure, the configuration parameters having a tree representation, create a copy of the tree representation of the configuration parameters and generate a template having a plurality of matched pattern instances based on the copy of the tree presentation of the configuration parameters, each of the plurality of matched pattern instances being a single representation of configuration parameters for at least two different services or devices of the network infrastructure.

In one aspect, a non-transitory computer-readable medium has computer-readable instructions stored thereon, which when executed by one or more processors, cause the one or more processors to obtain configuration parameters of services and devices of a network infrastructure, the configuration parameters having a tree representation, create a copy of the tree representation of the configuration parameters, and generate a template having a plurality of matched pattern instances based on the copy of the tree presentation of the configuration parameters, each of the plurality of matched pattern instances being a single representation of configuration parameters for at least two different services or devices of the network infrastructure.

2. Description

The disclosed technology addresses the need in the art for eliminating more efficient and accurate scheme for modifying/updating configuration data of services/devices provided in network infrastructure. Disclosed herein are systems, methods and computer-readable media for generating a normalized (e.g., syntax, format and in general operating system (OS) independent) report of configuration data for services/devices in an underlying network infrastructure. According to the present disclosure, configuration data of the underlying network, having a configuration tree structure, is traversed and patterns (e.g., recurring patterns) in the configuration data of the underlying network are detected. The detected patterns are then provided as an easy-to-use template to a network operator (supervisor) through which any modification and updating of the configuration data can be made, where such modification(s)/update(s) are then automatically pushed to appropriate devices/services in the underlying network. One example of a network component that generates this normalized template of configuration data is a controller or orchestrator, such as a network service orchestrator (NSO), which will be further described below, or a NFV management and orchestration (NFV-MANO) component in an NFV (network function virtualization) environment.

The present disclosure initially provides an example network architecture, as shown in FIG. 1, where the network architecture includes different network layers including an NSO layer and the underlying network infrastructure. The discussion will then proceed to FIGS. 2A and 2B, which describes a network component on which the NSO is implemented. The discussion will then turn to the generation of the configuration data template mentioned above, according to FIG. 3 and FIG. 4. Finally, example template generated according the present disclosure will be described with reference to FIG. 5 and FIG. 6.

FIG. 1 illustrates a network architecture, according to one aspect of the present disclosure. As shown in FIG. 1, network 100 includes three main layers, namely, network layer 102, management layer 104 and NSO layer 106. Network layer 102 is a network infrastructure that can be a hybrid network of physical network devices that form physical networks 102-1 (e.g., switches, routers, etc.), virtual network devices that form virtual networks 102-2 (e.g., virtual switches, virtual routers, etc.) as well as networking applications 102-3 including, but not limited to, software defined network (SDN) controllers, element management systems (EMSs), network management systems (NMSs), virtual network function managers (VNFMs), etc. Any one of or a combination of these devices and applications may form a datacenter, a wide area network (WAN), one or more consumer premise equipment (CPEs), etc. Each of the elements of the network infrastructure in network layer 102 has a corresponding configuration parameter/data that describe a structure of the corresponding element including the element's syntax, semantics, etc. Furthermore, any one of or a combination of network elements in network layer 102-1 provide one or more services to a network service provider's customers, where each service may have corresponding configuration data and parameters as well.

Management layer 104 can include management application(s) 104-1 including, but not limited to, self-service portals, flow through provisioning on traditional operating support systems (OSSs), WAN automation engines and/or other orchestration software.

Management layer (network management layer) 104 can also include interface(s) 104-2 for facilitating interaction between network 100 and network engineers.

Network 100 also includes NSO layer 106. NSO layer 106 can sit between network layer 102 and management layer 104. NSO layer 106 functions to facilitate, orchestrate and manage changes to services and devices in network layer 102 as commanded/directed by applications 104-1 and/or network engineers through interface 104-2 of management layer 104.

NSO layer 106 includes an orchestrator 106-1 running on, for example, a server, one or more virtual machines, one or more software containers, etc. Orchestrator 106-1 has a service manager 106-2, device manager 106-3 and network element drivers (NEDs) 106-4. Service manager 106-2 and/or device manager 106-3 interfaces with management application 104-1 and/or interface 104-2 via any programming language and interface including, but not limited to, REST, NETCONF, Java, Python, Erlang, etc. Interface 104-2 also communicates with service manager 106-2 and/or device manager 106-3 using any interface, such as a command line interface (CLI), web user interface (UI), etc. Service manager 106-2 and device manager 106-3 can function to manage and control operations of services and devices at network layer 102, respectively.

Orchestrator 106-1 also has NEDs 106-4 that can implement (fetch) modifications (e.g., additions, deletions and/or changes) to services and devices at network layer 102 using any network management protocol or interface, including but not limited to, NETCONF, REST, SNMP, etc., and/or any CLI.

NSO layer 106 also has a storage 106-5. In one example, devices and services available at network layer 102, each of which is described according to its corresponding syntax, semantics and structure are stored in storage 106-5. In one example, these structures are stored according to what is known as YANG modeling/language. YANG is used to model configuration data, state data, Remote Procedure Calls, and notifications for network management protocols. In one example, configuration data and parameters of services offered by network devices at network layer 102 are part of service models stored in storage 106-5 while configuration data and parameters of network devices themselves are part of device models stored in storage 106-5.

In one example and according to YANG modeling, device and service configuration data are stored in storage 106-5 having a configuration tree format. In one example, a configuration tree can have different types of nodes. Hereinafter a node refers to a configuration parameter in the configuration structure of devices and services stored in storage 106-5. The first type of node can be referred to as containers that can include both static and non-static nodes having one or more children. A static node can refer to a configuration parameter that any of the underlying devices at network layer 102 have (e.g., an IP address), regardless of an actual value of such configuration parameter (e.g., any network device would have an IP address regardless of the exact IP address). A non-static node can refer to a parameter that can be included as part of configuration data of a service or a device and if included, such non-static node can have one or more children (e.g., one or more parameters that are changeable once a change is made to the non-static node). An example of a non-static node is an L2 or L3 VLAN.

The second type of node can be referred to as a list node that has one or more named sub-nodes, where each sub-node can be identified by a key and at least one type of leaf node. An example of a list node is a network policy or a service policy governing operation of one or more devices and or services at network layer 102.

The third type of node can be referred to as a leaf that carries values (e.g., a model number of a device or service, a model type of a device or service, a status of a device or service, etc.). An example of data model having the above described types of nodes is:

```
container router {
    list bgp {
        key as-no;
        max-elements 1;
        leaf as-no {
            type uint16 {
                range "1..65535";
            }
        }
        list neighbor {
            key id;
            leaf id {
                type union {
                    type string;
                    type inet:ipv4-address;
                    type inet:ipv6-address;
                }
            }
            leaf remote-as {
                type uint16 {
                    range "1..65535";
                }
            }
            container ebgp-multihop {
                presence "Allow EBGP neighbors not on directly connected "
                +"networks";
                leaf max-hop {
                    type uint8 {
                        range "1..255";
                    }
                }
            }
        }
    }
}
```

With the following example configuration:

```
router {
    bgp 64512 {
        neighbor 1.2.3.4 {
            remote-as 1;
            ebgp-multihop {
                max-hop 3;
            }
        }
    }
}
```

In the above example, "router" is an example of a static container while "ebgp-multihop" is an example of a non-static container. Furthermore, "bgp" (key being as no) and "neighbor" *key id) are examples of a list node. Finally, "remote-as" and "max-hop" are examples of a leaf node.

Figure 2A:
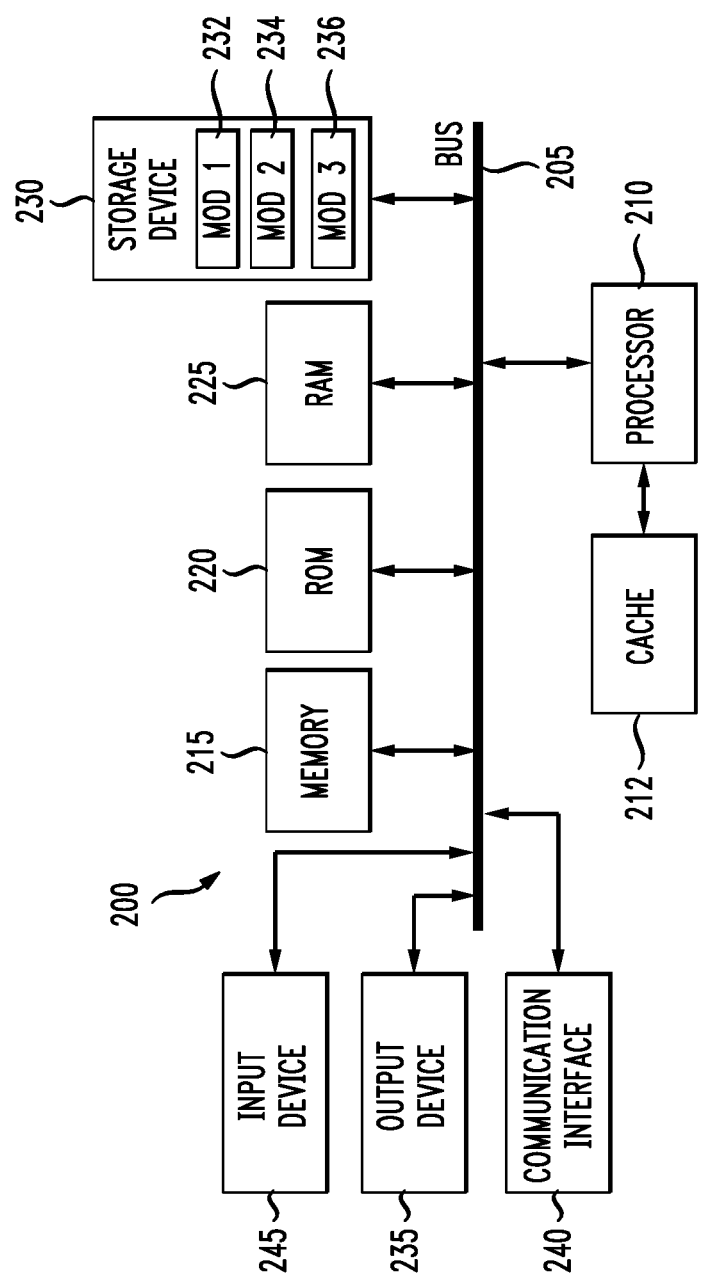
FIG. 2A illustrates a structure of a system component on which NSO layer of the architecture shown in FIG. 1 is implemented, according to an aspect of the present disclosure.
Figure 2B:
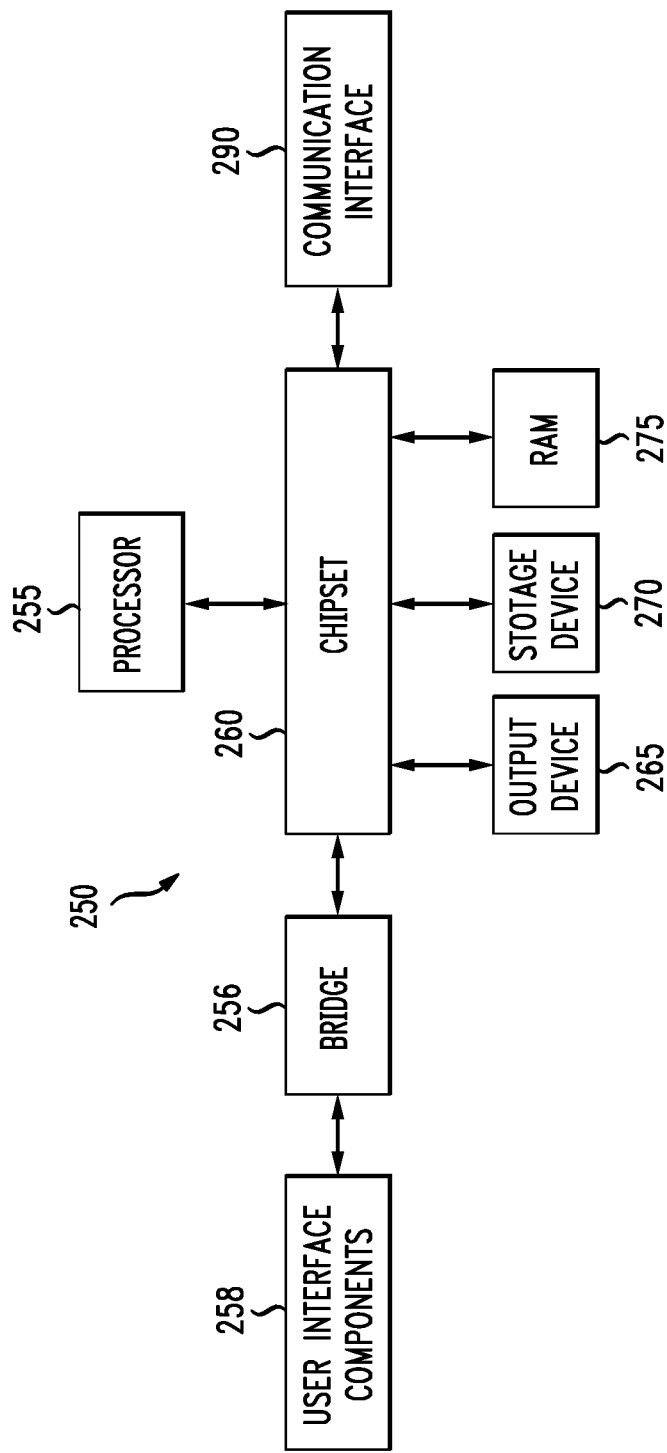
FIG. 2B illustrate a structure of a system component on which NSO layer of the architecture shown in FIG. 1 is implemented, according to an aspect of the present disclosure.

FIG. 2A and FIG. 2B each illustrate a structure of a system component on which NSO layer of the architecture shown in FIG. 1 is implemented, according to an aspect of the present disclosure. Those having ordinary skills in the art will appreciate that other system configurations are also within the scope of the present disclosure and are possible and that the structure of the system on which the NSO layer 106-5 is implemented is not limited to that depicted in FIG. 2A and FIG. 2B.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including system memory 215, such as read only memory (ROM) 220 and random access memory (RAM) 225, to processor 210. In one example, system architecture 200 can be a Linux machine, a virtual machine, etc., on which NSO layer 106 is implemented. In one example, memory 215 stores the storage 106-5 described above with reference to FIG. 1, while processor 210 is configured to execute computer readable instructions to carry out the functionalities of orchestrator 106-1 described above with reference to FIG. 1. System 200 can include a cache of high-speed memory connected directly with, in close proximity to, or integrated as part of processor 210. System 200 can copy data from memory 215 and/or storage device 230 to cache 212 for quick access by processor 210. In this way, the cache can provide a performance boost that avoids processor 210 delays while waiting for data. These and other modules can control or be configured to control processor 210 to perform various actions. Other system memory 215 may be available for use as well. Memory 215 can include multiple different types of memory with different performance characteristics. Processor 210 can include any general purpose processor and a hardware module or software module, such as module 1 232, module 2 234, and module 3 236 stored in storage device 230, configured to control processor 210 as well as a special-purpose processor where software instructions are incorporated into the actual processor design. Processor 210 may essentially be a completely self-contained computing system, containing multiple cores or processors, a bus, memory controller, cache, etc. A multi-core processor may be symmetric or asymmetric.

To enable user interaction with computing device 200, an input device 745 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

Storage device 230 can include software modules 232, 234, 236 for controlling processor 210. Other hardware or software modules are contemplated. Storage device 230 can be connected to system bus 205. In one aspect, a hardware module that performs a particular function can include the software component stored in a computer-readable medium in connection with the necessary hardware components, such as processor 210, bus 205, display 235, and so forth, to carry out the function.

FIG. 2B illustrates an example computer system 250 having a chipset architecture that can be used in executing the described method and generating and displaying a graphical user interface (GUI). Computer system 250 is an example of computer hardware, software, and firmware that can be used to implement the disclosed technology. In one example, computer system 250 can be a Linux machine, a virtual machine, etc. on which NSO layer 106 is implemented. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output device 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 785 and execute appropriate functions, such as browsing functions by interpreting these inputs using processor 255.

It can be appreciated that example systems 200 and 250 can have more than one processor 210 or be part of a group or cluster of computing devices networked together to provide greater processing capability.

Having described the architecture of network 100 with reference to FIG. 1 and the structure of a network component on which NSO layer 106-5 is implemented with reference to FIG. 2A and FIG. 2B, we now turn to the discussion of a method for generating a normalized report of configuration data for services/devices in network layer 102.

As described above, as the number of devices/components and services increase at network layer 102, the task of manual configuration of each and every one of these devices/components and services becomes more tedious, especially when dealing with a hybrid network with various types of devices running in a distributed fashion and/or according to various types of operating systems and using different syntaxes, etc. Therefore, a mechanism is provided where a normalized report that is independent of any device or service's operating system, syntax, format, etc. is generated and presented to management layer 104 and then any change or modification provided by management layer 104 are automatically fetched to/implemented at appropriate underlying devices in network 102.

Figure 3:
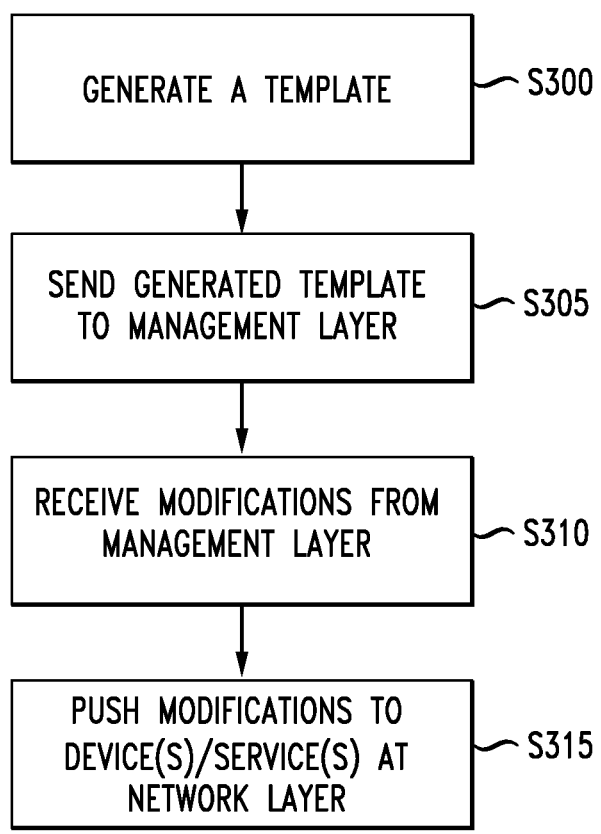
FIG. 3 illustrates a method of generating a normalized configuration data report, according to an aspect of the present disclosure.

FIG. 3 illustrates a method of generating a normalized configuration data report, according to an aspect of the present disclosure. FIG. 3 will be described from the perspective of orchestrator 106-1 of NSO layer 106 shown in and described with reference to FIG. 1.

At S300, orchestrator 106-1 generates a template that includes recurring patterns of configuration data for an arbitrary number of network devices and services configurations in network layer 102. In one example, orchestrator 106-1 generates the template based on a data tree (configuration tree having three types of nodes as described above) representation of configuration parameters of network devices and services available at the network layer 102. As will be described, in each recurring pattern, leafs (e.g., device/service model numbers, device/service model types, device/service status, etc.) that have the same value are assigned the same value while variable leafs have their values replaced with a magic value (e.g., "$$" value) representing that the values are of variable type.

For example, assume that a virtual router available at network layer 102 provides two instances of services to two different clients A and B (hence service A and service B). While many of the configurations of service A and service B are the same, one or more configurations between the two services may differ. At S300, which will be further described with reference to FIG. 4, orchestrator 106-1 determines a matched template for service A and service B and in the generated template creates a matched pattern for services A and B, in which configuration data values that are the same for both services A and B, keep their value while any configuration parameter that varies between services A and B have their corresponding values replaced with a magic value in the matched pattern.

In one example, the template is a normalized representation of configuration data for network devices and services, which means that the template provides a syntax-independent, operating system-independent, platform-independent, format-independent, etc., representation of configuration data of network devices and services. In other words, the normalized representation of configuration parameters of the network devices and services is format-independent and structure-independent representation. Accordingly, the review and modification of configuration data using the normalized representation becomes much easier and more convenient for network management applications and network engineers at management layer 104.

Generation of the template at S300 will be further described with reference to FIG. 4.

Once the template is generated, which includes normalized representation of configuration data of all or a portion of devices and services provided at network layer 102, at S305-S315, orchestrator 106-1 manages the configuration parameters of network devices and services based on the template generated at S300.

More specifically, at S305, orchestrator 1061-1 sends the generated template to management layer 104. One of management application(s) 104-1 and/or interfaces 104-2 (operated by for example a network engineer), may view and/or modify one or more parameters (configuration) values in the template.

At S310, orchestrator 106-1 receives such modification from management layer 104 through appropriate communication languages and interfaces (e.g., REST, NETCONF, Erlang, web UI, CLI, etc.). Upon receiving such modification, at S315, through appropriate ones of the service manager 106-2 and/or device manager 106-3, orchestrator 106-1 decomposes/analyses the modifications, which are then pushed by orchestrator 106-1 (e.g., via NEDs 106-4 of orchestrator 106-1) to appropriate devices at network layer 102, as described above.

Accordingly, through generation of this normalized template, not only orchestrator 106-1 streamlines and simplifies the process of viewing devices/services configuration parameters at management layer 104, it will also enable management applications and engineers at management layer 104 to conveniently make changes to configuration parameters using the generated template and through orchestrator 106-1, automatically implement the changes at various devices throughout the network at network layer 102 (thus eliminating the need for manual configuration (provisioning, versioning, etc.) of device and services parameters by network engineers).

Figure 4:
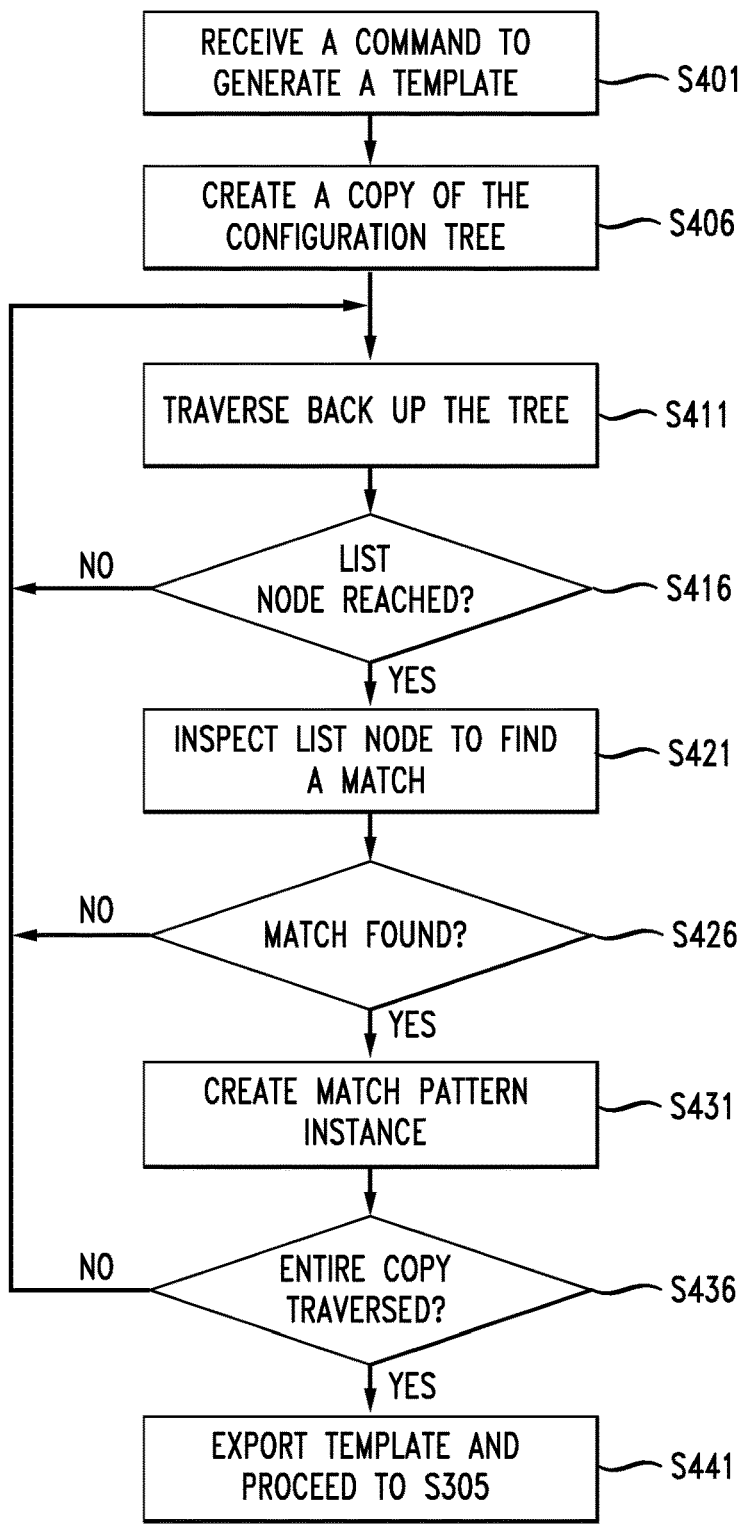
FIG. 4 describes a method of generating the template of FIG. 3, according to an aspect of the present disclosure.

FIG. 4 describes a method of generating the template of FIG. 3, according to an aspect of the present disclosure.

At S401, orchestrator 106-1 receives a command to generate the template. In one example, the command is received from the management layer 104 (e.g., a CLI command provided by a network engineer via the interface 104-2).

At S406 and upon receiving the command at S401, orchestrator 106-1 accesses a network structure in storage 106-5 (e.g., the configuration tree stored in storage 106-5) and creates a copy of the configuration tree representation of devices and services of network layer 102. As mentioned above, the configuration tree of devices and services of network layer 102 is created and stored in storage 106-5 according to YANG models. Therefore, at S406, orchestrator 106-2 traverses the configuration tree depth-wise to create the copy of the configuration tree.

At S411, orchestrator 106-1 traverses back up the copy of the configuration tree created at S406.

At S416 and during the traversal back up the copy of the configuration tree, orchestrator 106-1 determines (detects) if a list node is reached. As discussed above a list node is a configuration parameter that may have one or more children. For example, a policy map for a service can be a list node.

If at S416, orchestrator 106-1 determines that a list node is not reached, orchestrator 106-1 reverts back to S411 and S411 and S416 are repeated until a list node is reached.

Upon reaching a list node at S416, at S421, orchestrator 106-1 inspects list (an inspected list node) and one or more children nodes included therein to determine if the list matches one or more other list nodes reached previously by orchestrator 106-1 during the traversal (previous list node(s)). Obviously, in this step and when orchestrator 106-1 reaches a list node for the first time during a traversal back up the copy of the configuration tree, such matching to other list nodes does not exist. However, finding a match becomes possible after the first list node and when orchestrator 106-1 reaches a second list node, a third list node, etc., during the traversal back up the copy of the configuration tree.

At S426, orchestrator 106-1 determines if a match has been found between the inspected list node and at least one previous list node. In one example, orchestrator 106-1 determines that an inspected list node matches at least one previous list node if the inspected list node and the at least one previous list node have the same structure (e.g., if they have the same set of internal nodes/children and leaves). In one example and when the inspected list node matches with at least one other list node, the leaves in the two list nodes can have different values.

If a match is not found at S426, process reverts back to S411 and orchestrator 106-1 repeats S411-S426. However if a match is found at S426, then at S431 and upon determining that the inspected list node matches with at least one previous list node, orchestrator 106-1 creates (generates) a matched pattern instance. In one example and in creating the matched pattern instance, orchestrator 106-1 keeps values of the leaves that are the same in the inspected list node and the at least one previous list node with which the inspected list node matches while replacing values of any leaves having different values in the inspected list node and the at least one previous list node, with a magic value (e.g., "$$" value).

At S436 and after creating a matched pattern instance, orchestrator 106-1 determines if the entire copy of the configuration tree has been traversed during the traversal back up the copy. If at S436, orchestrator 106-1 determines that the entire copy has not been traversed, then the process reverts back to S411 and orchestrator 106-1 repeats S411-S436.

However, if at S436, orchestrator 106-1 determines that the entire copy of the configuration tree has been traversed back up, then at S441, orchestrator 106-1 exports the match pattern instance(s) into a template and hence generates the template at S300. Thereafter, the process reverts back to S305 of FIG. 3, as described above.

Having described the process of generating a template of recurring matched patterns and managing devices and services configuration parameters according to FIG. 3 and FIG. 4, we now present a comparison between the results of retrieving configuration parameters of various devices and services according to convention methods (FIG. 5) and generating a template for displaying and managing configuration parameters of devices and services according to methods of the present disclosure (FIG. 6).

FIG. 5 illustrates a representation of configuration parameters of two interfaces generated according to conventional methods. As shown in FIG. 5, the representation of configuration parameters of two interfaces named "GigabitEthernet 0/0/0/1" and "GigabitEthernet 0/0/0/2" is curly-bracket based, and Internetworking Operating System (IOS) CLI-based developed by Cisco Systems, Inc. of Cupertino, Calif. The representation is provided as a single interface list on an interface at management layer 104. As can be seen, each of the two represented interfaces has corresponding configuration parameters displayed and it can easily be seen that as the number of devices and services at network layer 102 increases, relying on such individualized representation of configuration parameters of all the devices and services at network layer 102 can quickly become very difficult to track and manage.

FIG. 6 illustrates an example of a template generated according to method of FIG. 3 and FIG. 4, according to an example embodiment. Implementing methods of FIG. 3 and FIG. 4, orchestrator 106-1 detects a matched pattern between configuration parameters of interfaces "GigabitEthernet 0/0/0/1" and "GigabitEthernet 0/0/0/2" and generates the template shown in FIG. 6 (a single template as opposed to two separate representations of for the two different interfaces shown in FIG. 5), in which configuration parameters that have the same value for both interfaces "GigabitEthernet 0/0/0/1" and "GigabitEthernet 0/0/0/2" (e.g., the description leaf or the mask leaf), retain their value in the generated template while configuration parameters for both interfaces "GigabitEthernet 0/0/0/1" and "GigabitEthernet 0/0/0/2" that have different values (e.g., the IP addresses) are replaced with a magic value (e.g., {$ip}).

Furthermore, a comparison between FIG. 5 and FIG. 6 shows that the template generated according to FIG. 3 and FIG. 4 and shown in FIG. 6 is format, syntax and OS independent unlike that shown in FIG. 5 which follows curly-bracket based, and Internetworking Operating System (IOS) CLI-based developed by Cisco Systems, Inc. of Cupertino, Calif.

As also described with reference to FIG. 3, a network engineer or a management application at management layer 104 can use the displayed template of FIG. 6 to make any changes to modifications to any one of configuration parameters shown therein. Thereafter and upon receiving the modifications, orchestrator 106-1 implements the changes at interfaces GigabitEthernet 0/0/0/1" and "GigabitEthernet 0/0/0/2" at network layer 102. Therefore, the generated template according to FIG. 3 and FIG. 4 provides an accurate and efficient scheme for both presenting and making changes to configuration parameters of (not only two different devices as shown in FIG. 6) but rather to a large number (e.g., thousands or hundreds of thousands) of devices and services operating at network layer 102.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

The invention claimed is:

1. A method comprising:
    obtaining configuration parameters of services and devices of a network infrastructure, the configuration parameters having a tree representation;
    creating a copy of the tree representation of the configuration parameters;
    generating a template having a plurality of matched pattern instances based on the copy of the tree presentation of the configuration parameters, each of the plurality of matched pattern instances being a single representation of configuration parameters for at least two different services or devices of the network infrastructure; and
    sending the template to a network management application layer and modifying at least one configuration parameter within the template to yield a revised template.

2. The method according to claim 1, wherein the generating generates the template as a format-independent and structure-independent representation of the configuration parameters.

3. The method according to claim 1, wherein the generating the template comprises:
    traversing the copy of the tree representation of the configuration parameters;
    determining a list node in the copy of the tree representation of the configuration parameters, the list node being a configuration parameter having one or more sub-nodes, each of the one or more sub-nodes having a value; and
    determining whether the list node matches one or more previously determined list nodes in the copy of the tree representation of the configuration parameters.

4. The method according to claim 3, further comprising:
    generating one of the plurality of matched pattern instances upon determining that the list node matches at least one of the one or more previously determined list nodes.

5. The method according to claim 4, wherein the generating one of the plurality of matched pattern instance includes:
    determining first configuration parameter values that are the same in the list node and the at least one of the one or more previously determined list nodes;
    determining second configuration parameters values that have different values in the list node and the at least one of the one or more previously determined list nodes;
    maintaining the first configuration parameter values in the matched pattern instance; and
    generating an indicator to replace the second configuration parameters values in the matched pattern instance, the indicator indicating variability of corresponding configuration parameters between the list node and the at least one of the one or more previously determined list nodes.

6. The method according to claim 3, wherein the list node matches one or more previously determined list nodes if the detected list node has a same structure as at least one of the one or more previously determined list nodes, the detected list node having the same structure as the at least one of the one or more previously determined list nodes if both the detected list node and the at least one of the one or more previously determined list nodes have a same set of internal sub-nodes.

7. The method of claim 1, further comprising:
    exporting the generated template including the plurality of matched pattern instances to a network management application layer.

8. A device comprising:
    one or more processors; and
    memory configured to store computer-readable instructions, which when executed by the one or more processors, cause the one or more processors to:
        obtain configuration parameters of services and devices of a network infrastructure, the configuration parameters having a tree representation;
        create a copy of the tree representation of the configuration parameters;
        generate a template having a plurality of matched pattern instances based on the copy of the tree presentation of the configuration parameters, each of the plurality of matched pattern instances being a single representation of configuration parameters for at least two different services or devices of the network infrastructure; and
        sending the template to a network management application layer and modifying at least one configuration parameter within the template to yield a revised template.

9. The device according to claim 8, wherein the execution of the computer-readable instructions by the one or more processors, cause the one or more processors to generate the template as a format-independent and structure-independent representation of the configuration parameters.

10. The device according to claim 8, wherein the execution of the computer-readable instructions by the one or more processors, cause the one or more processors to manage the configuration parameters for the at least two different services or devices of the network infrastructure based on the template.

11. The device according to claim 8, wherein the execution of the computer-readable instructions by the one or more processors, cause the one or more processors to generate the template by:
    traversing the copy of the tree representation of the configuration parameters;
    determining a list node in the copy of the tree representation of the configuration parameters, the list node being a configuration parameter having one or more sub-nodes, each of the one or more sub-nodes having a value; and determining whether the list node matches one or more previously determined list nodes in the copy of the tree representation of the configuration parameters.

12. The device according to claim 11, wherein the execution of the computer-readable instructions by the one or more processors, cause the one or more processors to:
generate one of the plurality of matched pattern instances upon determining that the list node matches at least one of the one or more previously determined list nodes.

13. The device according to claim 12, wherein the execution of the computer-readable instructions by the one or more processors, cause the one or more processors to generate one of the plurality of matched pattern instances by:
determining first configuration parameter values that are the same in the list node and the at least one of the one or more previously determined list nodes;
determining second configuration parameters values that have different values in the list node and the at least one of the one or more previously determined list nodes;
maintaining the first configuration parameter values in the matched pattern instance; and
generating an indicator to replace the second configuration parameters values in the matched pattern instance, the indicator indicating variability of corresponding configuration parameters between the list node and the at least one of the one or more previously determined list nodes.

14. The device according to claim 11, wherein the list node matches one or more previously determined list nodes if the detected list node has a same structure as at least one of the one or more previously determined list nodes, the detected list node having the same structure as the at least one of the one or more previously determined list nodes if both the detected list node and the at least one of the one or more previously determined list nodes have a same set of internal sub-nodes.

15. A non-transitory computer-readable medium having computer-readable instructions stored thereon, which when executed by one or more processors, cause the one or more processors to:
obtain configuration parameters of services and devices of a network infrastructure, the configuration parameters having a tree representation;
create a copy of the tree representation of the configuration parameters;
generate a template having a plurality of matched pattern instances based on the copy of the tree presentation of the configuration parameters, each of the plurality of matched pattern instances being a single representation of configuration parameters for at least two different services or devices of the network infrastructure; and
sending the template to a network management application layer and modifying at least one configuration parameter within the template to yield a revised template.

16. The non-transitory computer-readable medium according to claim 15, wherein the execution of the computer-readable instructions by the one or more processors, cause the one or more processors to generate the template as a format-independent and structure-independent representation of the configuration parameters.

17. The non-transitory computer-readable medium according to claim 15, wherein the execution of the computer-readable instructions by the one or more processors, cause the one or more processors to manage the configuration parameters for the at least two different services or devices of the network infrastructure based on the template.

18. The non-transitory computer-readable medium according to claim 15, wherein the execution of the computer-readable instructions by the one or more processors, cause the one or more processors to generate the template by:
traversing the copy of the tree representation of the configuration parameters;
determining a list node in the copy of the tree representation of the configuration parameters, the list node being a configuration parameter having one or more sub-nodes, each of the one or more sub-nodes having a value;
determining whether the list node matches one or more previously determined list nodes in the copy of the tree representation of the configuration parameters; and
generating one of the plurality of matched pattern instances upon determining that the list node matches at least one of the one or more previously determined list nodes.

* * * * *